UNITED STATES PATENT OFFICE.

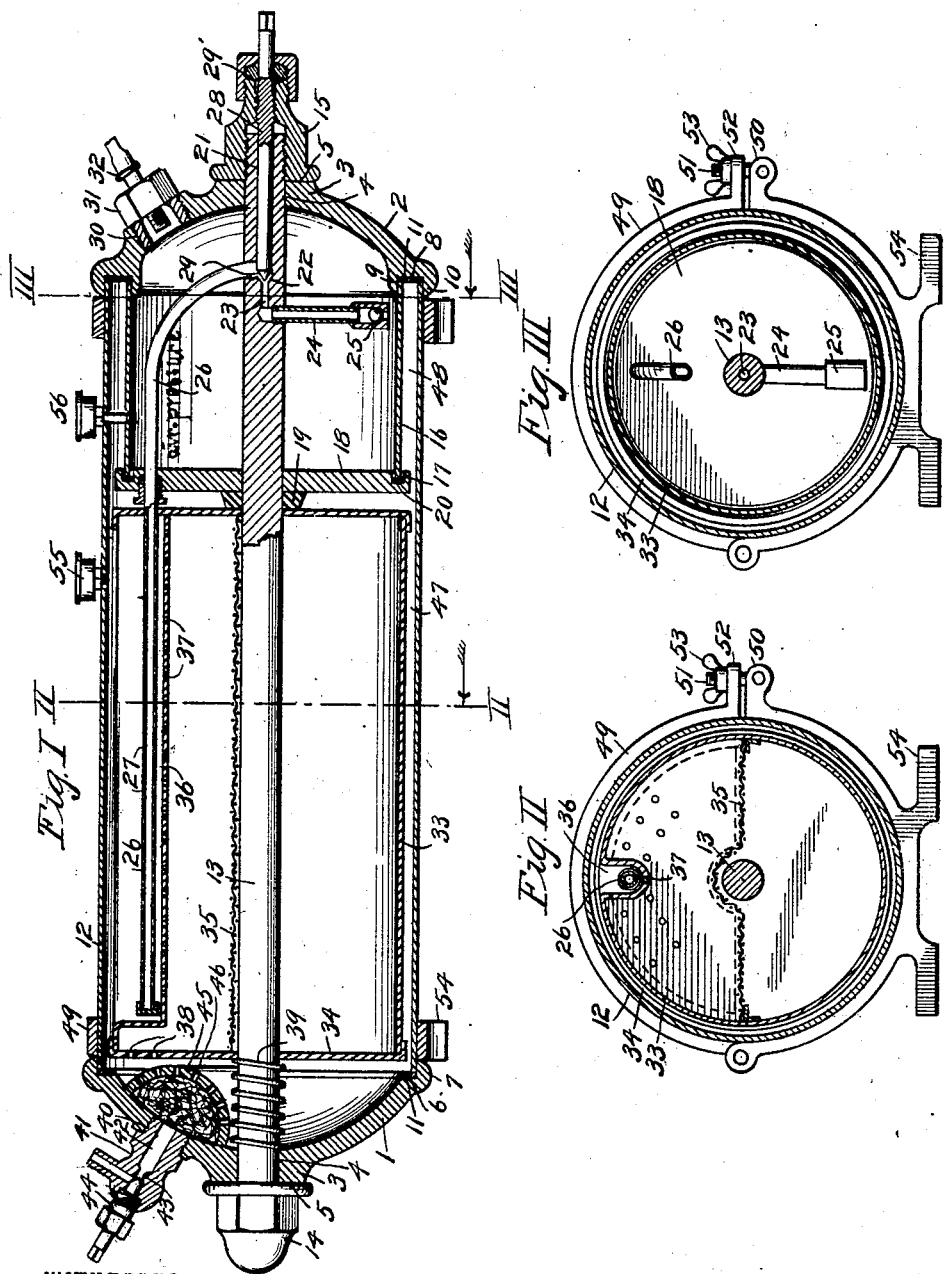

WILLIAM W. TOBEY AND ALFRED J. TOBEY, OF IOLA, KANSAS.

ACETYLENE-GAS GENERATOR.

978,512.   Specification of Letters Patent.   Patented Dec. 13, 1910.

Application filed June 13, 1910. Serial No. 566,533.

*To all whom it may concern:*

Be it known that we, WILLIAM W. TOBEY and ALFRED J. TOBEY, citizens of the United States, residing at Iola, in the county of Allen and State of Kansas, have invented certain new and useful Improvements in Acetylene-Gas Generators; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to acetylene gas generators, and has for its object to simplify the construction with a view to facilitating its application to an automobile running board or frame, and to provide a gas jacket for the water chamber to obviate freezing, and to provide an improved gas filter.

Other objects of the invention are apparent from the description and from the drawings, in which:—

Figure I is a longitudinal section of a generator constructed according to our invention. Fig. II is a cross section on the line II—II, Fig. I. Fig. III is a cross section on the line III—III, Fig. I.

Referring more in detail to the parts:—
1 and 2 designate end caps which are preferably semi-circular in outline and are provided with the bosses 3, having apertures 4 and flat outer faces 5. In the cap 1 is an offset shoulder 6, having a keeper flange 7 and in the cap 2 is a groove 8, formed by the inner and outer keeper flanges 9 and 10.

11 designates packing rings which are seated against the shoulder 6 and into the groove 8.

12 designates a cylinder which fits snugly within the keeper flanges 7 and 10 of the respective end caps and abuts against the packing rings 11 to form an air tight joint when the device is fully assembled.

Extending through the apertures 4 in the end caps is a rod 13, the ends of which project beyond the end caps and are threaded to receive the nuts 14 and 15, which latter are adapted to screw on the rods and against the end caps to bind the parts firmly together and lock the cylinder 12 against its packing rings.

16 designates a cylinder which is seated in the cap groove 8, against the keeper flange 9, and at its other end is seated in a groove 17 of a diaphragm plate 18 which is carried on the rod 13. The plate 18 is held firmly in position by a collar 19 which is rigidly mounted on the rod 13. The groove 17, in plate 18, is provided with packing 20 to provide a tight joint between the plate and cylinder 16.

The end of the rod 13 which projects through cap 2, is bored to form a valve stem channel 21, seat 22, and passage way 23. Fixed in the passage way 23 is a tube 24 having a ball valve 25, at its end, through which water from the chamber, formed by the cylinder 16, cap 2, and plate 18, may pass into the tube when the gas pressure is greater than the water pressure.

Opening into valve stem channel 21 is a tube 26 which extends through the diaphragm plate 18 and almost to the opposite end of the generator and is provided outside of the water chamber with apertures 27.

Extending through the stem channel 21 and through the nut 15 is a valve stem 28 having a needle point 29 adapted to regulate the opening in the valve seat 22.

We prefer to provide an ordinary stuffing box 29' on the nut 15 as illustrated.

In the cap 2 is an opening 30 in which is located a plug 31 having an automatic valve 32, so that the plug may be removed to fill the chamber with water, and air supplied through the valve 32 when the plug is in place.

In the gas chamber, which is formed by the cylinder 12, cap 1, the inside of the water chamber and a part of the cap groove 8, is a carbid can 33 having a lid 34 which is provided with a central aperture that registers with a central aperture in the can bottom, so that the body may be projected over the rod 13. Extending throughout the length of the carbid can is a mesh partition 35 which divides the can into halves, and separates the charge of carbid, to facilitate generation of gas. In one side of the can is formed a trough 36 for receiving the water tube 27; this trough being provided with apertures 37 in its bottom, through which water from the pipe may trickle into the carbid can and through which the generated gas may escape. Gas from the carbid can may also escape through openings 38 in the cover 34.

39 designates a spring which is coiled around the rod 13 and presses against the inner face of cap 1 and the outer face of lid 34 in order to retain the lid in position after the case has been closed.

In the cap 1 is an aperture 40 into which is threaded a plug 41 having a valved channel 42 and valve seat 43; the opening in which is regulated by a needle valve 44.

45 designates a casing on the inner face of cap 1 which is provided with apertures 46 through which gas from the gas chamber may pass a packing of asbestos fiber, or the like, being located within the casing to act as a filter for the gas.

We prefer to construct the carbid can of sufficiently less diameter than the interior diameter of the cylinder 12 to provide an annulus 47 within which gas may circulate.

The cylinder 16 and diaphragm plate 18 are adapted to provide an annulus 48 around the water chamber, within which the gas may circulate to provide a gas packing and obviate freezing of the water in this chamber during extremely cold weather.

Surrounding the cylinder 12 are jointed bands 49, having lugs 50 in which bolts 51 are pivoted and having ears 52 into which the bolts may pass to be secured thereto by wing nuts 53. The bands 49 are also provided with feet 54, by which they may be secured to the running board or frame of an automobile or other vehicle.

We prefer to provide the device with gages 55 and 56 for indicating the gas and water pressure respectively.

To install the generator the bands 49 are secured to a convenient portion of the vehicles, (not shown) so that the loose portions may be swung away from the fixed portion, when it is desired to remove the tank. To charge the tank, the loose band portions are disconnected from the rigid portions and swung away from same, so that the tank may be removed. The nut 14 is unscrewed, the cap 1 removed from the cylinder 12 and the can 33 taken out of the cylinder; carbid is then placed in the can and the latter is replaced in the cylinder and the cap again tightened against the end of the cylinder to form a gas tight joint. The plug 31 is removed and the water chamber charged, after which the plug may be replaced and air pumped into the water chamber to provide the necessary pressure. The valve 28 is then manipulated to provide a desired flow of water from the water chamber to the carbid chamber. Water passes up through the ball valves and conduits from pipe 27 from which it trickles into the trough 36 and thence into the carbid can. As soon as water strikes the carbid in the can, gas is generated and escapes from the can into the outer chamber and out through the filter and valve plug 41 to the lamps, the latter being connected to the valve plug by a suitable tube, not shown. When a sufficient quantity of gas has been generated, the pressure of gas in the pipe 27 forces the water back through the conduits to valve 25 which is closed to shut off the supply of water until the gas chamber has been depleted and a new supply is necessary.

It is apparent that when the pressure in the gas chamber gets below the pressure in the water chamber, that the valve 25 will again open to provide a new supply and further generation.

Having thus described our invention, what we claim as new therein and desire to secure by Letters-Patent is:—

1. In an acetylene gas generator, a tank comprising end caps, one having an offset shoulder, and the other having a groove, a cylinder set into the shoulder and groove, a rod extending through the end caps and having threaded ends carrying nuts, whereby the caps are tightened on the ends of the cylinder, said rod having a valve channel and seat in one end, a cylindrical water chamber set into the groove in said end cap within the main cylinder and set in therefrom to provide an annulus, a diaphragm plate carried on said rod and having a groove into which the opposite end of said cylindrical water chamber is projected, a carbid cylinder set in from the main cylinder to provide an annulus, a tube having communication with said valve channel and projected through said diaphragm plate, a valve adapted for controlling flow through said valve channel and tube, and separate means for communication with the gas and water chamber, substantially as and for the purpose set forth.

2. In an acetylene gas generator, a tank having separate water, carbid and gas chambers, a centrally located rod having threaded ends carrying clamping nuts whereby the parts of the generator are held in position, said rod having a valve channel and seat near one end, a valve stem in the valve channel in said rod, a stuffing box formed in said adjacent clamping nut, a check valved connection between said gas and water chambers, connection between said valve and said carbid chamber, a filler cap and air charging valve for said water chamber, and an outlet valve for said gas chamber, substantially as and for the purpose set forth.

In testimony whereof we affix our signatures in presence of two witnesses.

WILLIAM W. TOBEY.
ALFRED J. TOBEY.

Witnesses:
C. E. PECHUM,
ALLA LOGAN.